July 6, 1965  P. C. BEAN  3,192,977
FRUIT PEELING METHOD
Original Filed Nov. 12, 1957
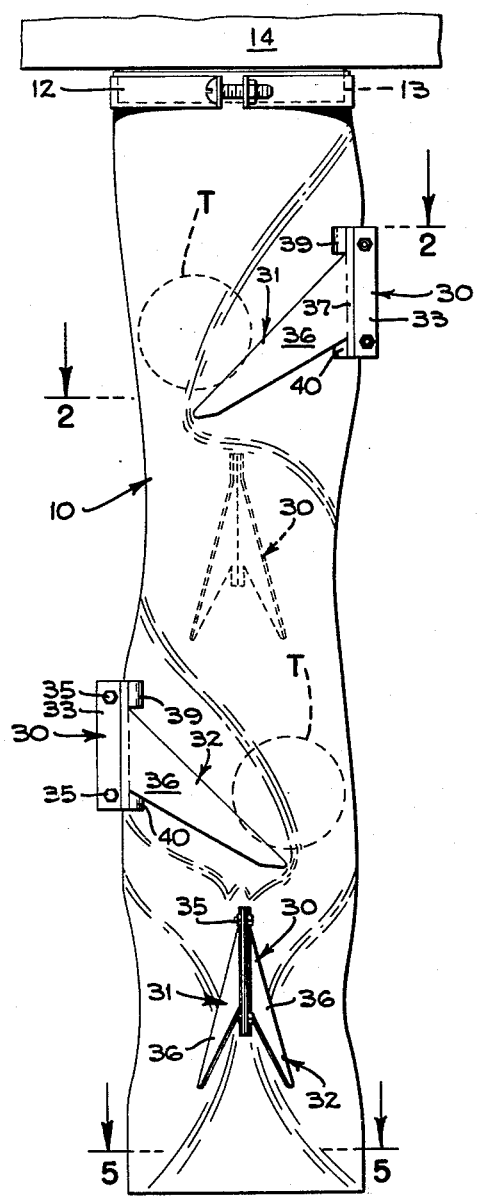
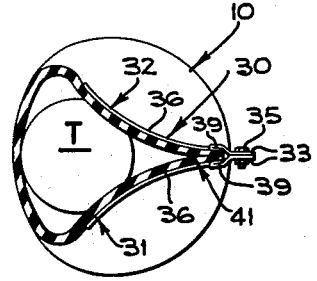
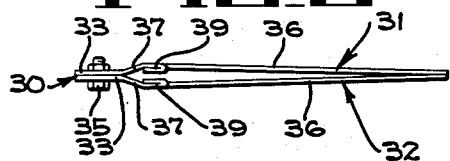
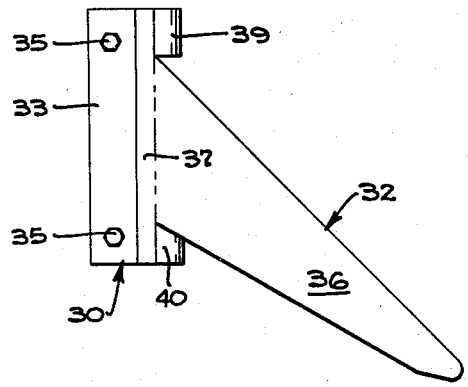
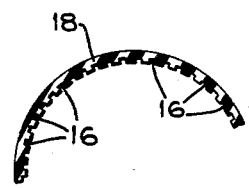
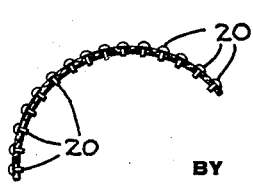
INVENTOR
PAUL C. BEAN
BY Hans G. Hoffmeister.
ATTORNEY 3,192,977
FRUIT PEELING METHOD
Paul C. Bean, Cupertino, Calif., assignor to FMC Corporation, a corporation of Delaware
Original application Nov. 12, 1957, Ser. No. 695,727, now Patent No. 3,024,821, dated Mar. 13, 1962. Divided and this application June 14, 1961, Ser. No. 117,077
5 Claims. (Cl. 146—241)

The present invention pertains to fruit processing and more particularly relates to a method of peeling fruit.

This application is a division of the copending application Serial No. 695,727, for Fruit Processing Apparatus, filed November 12, 1957, and issued as U.S. Patent No. 3,024,821.

In peeling fruit, such as tomatoes, the fruit is treated with a caustic solution to weaken the skin of the fruit and loosen the skin from the flesh. After this treatment, the weakened skin is still disposed around the fruit and must be completely removed without damaging the flesh of the fruit.

It is an object of the present invention to provide an improved method of peeling fruit.

Another object of the invention is to provide an improved method of peeling fruit without harmful effect upon the flesh of the fruit.

Another object is to provide an improved method of stripping the peel from the flesh of such fruit as whole tomatoes.

Another object is to provide an improvement method of peeling fruit such as whole tomatoes, whereby the peel is stripped in successive steps from different surface areas of the fruit to completely peel the flesh.

Another and further objects and advantages of the present invention will become apparent from the following description taken in connection with the accompanying drawings in which:

FIG. 1 is an elevation of a fruit peeling apparatus used in carrying out the method of the present invention, said apparatus being shown mounted in depending relation on a support.

FIG. 2 is a horizontal section taken on line 2—2 of FIG. 1.

FIG. 3 is a plan of a clip used on the peeler of FIG. 1.

FIG. 4 is an elevation of the clip of FIG. 3.

FIG. 5 is a fragmentary section taken transversely of the peeling tube of a modified form of the peeling apparatus used in carrying out the method of the present invention.

FIG. 6 is a fragmentary section similar to FIG. 5, showing a second modification of the peeling tube used in carrying out the method of the present invention.

The fruit peeler of the present invention comprises a tubular member 10 (FIG. 1) that is secured by a clamp 12 to a tubular flange 13 which is formed about a suitable opening (not shown) in the lower wall of a hopper or chute 14. The hopper 14 is adapted for use with a machine which is arranged to apply caustic solution to the fruit to weaken and loosen the skin and deliver the fruit to the hopper 14. The fruit falls into the opening from the hopper 14 and through the tubular flange 13 into the tubular peeling member 10.

The peeling member 10 may take the form of any member that has means defining a tortuous passage along which the tomato must move as it descends. The member acts to abrade the peel of the tomato and may be formed of any coarse-textured material, such as burlap or canvas, or it may be made of relatively smooth material whose inner surface has been roughened as by providing serrations or grooves 16 (FIG. 5) in a tube 18 made of rubber. In one embodiment, the peeling member 10 is made of a sponge rubber material having a plurality of small projections on its inner surface. Alternatively, the member 10 may have an inner surface formed by securing a plurality of rivets 20 (FIG. 6) to the member so that the inner ends of the rivets provide a plurality of projections adapted to engage the skin of the fruit.

The tortuous passage through the peeling member is formed by internal abutment or deflector wall portions that intercept and direct the fruit laterally as it drops. In the embodiment of the invention shown in FIG. 1, the tortuous path is provided by means of a series of V-shaped spring steel clamps or clips 30 that are positioned on the tube 10 in spaced relation longitudinally of the tube with each clip displaced 90° around the tube from the adjacent clips. As seen in FIG. 2, each clip 30 restricts the vertical passage in the member. Accordingly, each tomato is forced to contact the inner walls of the tube as it approaches one of the clips and, upon passing the clip, each tomato is shifted laterally into engagement with the wall opposite the clip as it moves downwardly and is aligned with the next clip. By the time the tomato leaves the lower end of the tube, the skin, which has been weakened by the lye treatment, is stripped from the tomato. It will be noted in FIG. 2, that the restricted portion of the passage may be made smaller in area than the effective cross section of the tomato T so that the clamp at this portion of the passage must open a small amount to permit the tomato to move therethrough. With this arrangement, a large area of the skin of the tomato is contacted by the peeling surface as it moves through the restricted passage.

As seen in FIGS. 3 and 4 each clip 30 comprises two opposed plates 31 and 32 which are identical but are oppositively disposed. Each plate has a flat portion 33 which is secured in abutting relation to the flat portion of the other plate by bolts 35. A generally triangular portion 36 of each plate is connected to the associated flat portion 33 by a slanted connecting wall 37. Since the two walls 37 slant in opposite directions, the triangular portions 36 are spaced from each other adjacent the slanted walls 37 but are in contact at their outer ends. To position a clip on the tube, the outer ends of the triangular portions 36 are separated and the clip is then placed on the tube. The natural resiliency of the spring steel causes an upper pair 39 and a lower pair 40 of inturned tabs (FIGS. 3 and 4) to grip the tube, as seen in FIG. 2. The triangular portions 36 press the side wall portions inwardly toward each other to form obstruction that restrict the passage in the tube.

It will be evident that the tortuous passage through the tube may be formed by means other than the clips 30, as by sewing together those wall portions of the tube that are held together by the clips, as for example the wall portions indicated generally by the arrow 41 in FIG. 2.

The peeled tomatoes may be collected in any collecting means disposed below the peeling tubes 10.

From the foregoing description it will be seen that the present invention provides an efficient method of peeling fruit. The nature of the inner surface of the peeling tube and the arrangement of the tortuous passage therethrough are such that the fruit is not only shifted from side to side in the tube as it falls but is also moved in a circular path around the axis of the tube. This combined side-to-side and rotary movement causes a comprehensive contact of the fruit with the roughened surface of the peeling tube whereby all of the skin of the fruit is removed.

In the appended claims, the term "rough" will be used to generically indicate the nature of the interior surface of the peeling tube.

It will be understood that modifications and variations of the peeling method disclosed herein may be made without departing from the scope of the present invention.

Having thus described the invention, what is claimed as new and is desired to be protected by Letters Patent is:

1. A method of removing skin from the flesh of a fruit that has been treated so as to loosen its skin comprising dropping the fruit through a plurality of vertically spaced skin removing stages, and subjecting the fruit at each of said stages to frictional grasp applied circumferentially of the fruit, each grasp comprising simultaneously frictionally engaging circumferentially spaced segments of the loosened skin of the fruit while the flesh of the fruit continues to fall although at a retarded speed with different segments of the fruit being frictionally engaged at successive stages thereby to strip substantially all of the skin from the flesh.

2. A method of peeling fruit in an open-ended pendent flexible tube providing a generally cylindrical wall circumscribing a vertical fruit passageway and having an internal abrasive surface, comprising restricting the passageway to a transverse dimension approximating that of a fruit to be peeled at a plurality of positions spaced lengthwise of the tube with the restrictions being progressively angularly displaced about the tube, and dropping fruit having loosened skin into the tube whereby a different group of spaced segments of skin are frictionally grasped by said abrasive surface as said fruit falls through each restriction so as to strip skin from the fruit.

3. A method of peeling fruit in an open-ended pendent flexible tube providing a generally cylindrical wall circumscribing a vertical fruit passageway and having an internal abrasive surface, comprising yieldably pinching portions of the wall together at positions spaced lengthwise of the tube with successive pinched portions being progressively displaced by approximately ninety degrees around the tube thereby providing a plurality of similarly displaced yieldable restrictions that are smaller than the fruit to be peeled, and dropping fruit with loosened skin into the upper end of the tube so that the fruit has sufficient velocity to force its way through the uppermost restriction, said fruit being retarded in velocity as it passes through each restriction and increasing in velocity after release from each restriction thereby to enable its descent through successive restrictions whereby skin is stripped from the flesh of the fruit by frictional engagement of said abrasive surface with segments of skin at each restriction.

4. The method of removing the loosened peel from fruit which includes the steps of effecting the advance of a fruit along a predetermined path, successively deflecting the advancing fruit in different directions extending transversely of said path to place the fruit in several different aspects relative to said path, and while the fruit is in each of said aspects simultaneously applying pressure against several side regions of the fruit, said pressure being applied in a plane that is perpendicular to the direction of advance of the fruit, thereby to strip peel from the advancing fruit.

5. The method defined in claim 1 including the step of deflecting a dropping fruit laterally preceding each skin removing stage to change the aspect of the fruit prior to subjecting the fruit to frictional grasp at the succeeding one of said skin removing stages.

References Cited by the Examiner
UNITED STATES PATENTS

| | | | |
|---|---|---|---|
| 564,881 | 7/96 | Gould | 56—340 |
| 1,241,529 | 10/17 | Linville et al. | 146—47 |
| 1,394,138 | 10/21 | Bost et al. | 146—50 X |
| 1,473,021 | 11/23 | Duncan | 146—47 X |
| 1,581,071 | 4/26 | Lowe | 146—47 |
| 2,605,798 | 8/52 | Boswell | 146—49 |

FOREIGN PATENTS 22,141    11/05    Austria.

J. SPENCER OVERHOLSER, *Primary Examiner.*

CARL W. ROBINSON, *Examiner.*